Oct. 17, 1933.   M. DOESINGER   1,930,968
SECTIONAL POUCH SCREW
Filed July 2, 1932
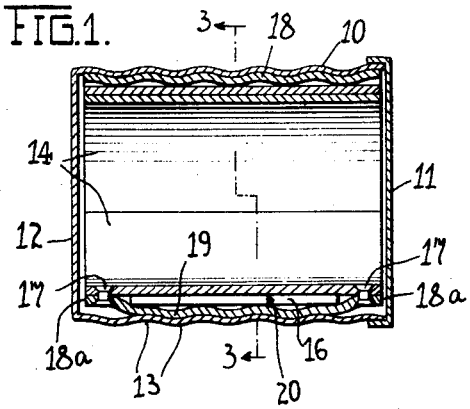
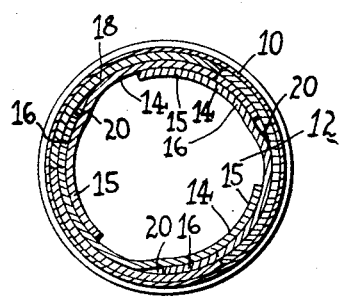
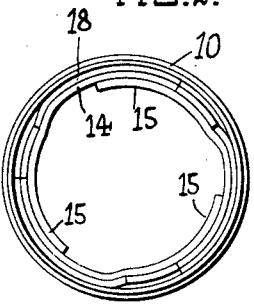
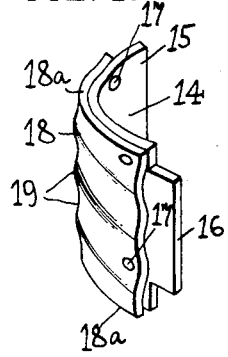
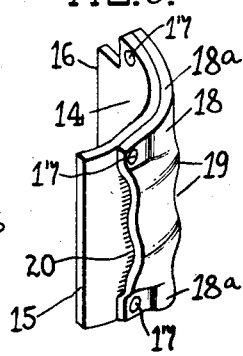
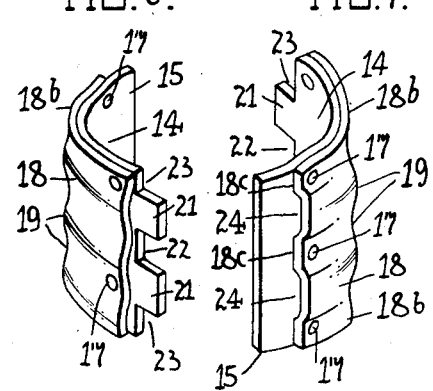
INVENTOR
MARTHA DOESINGER
BY F. Ledermann
her ATTORNEY Patented Oct. 17, 1933

1,930,968

UNITED STATES PATENT OFFICE 1,930,968

SECTIONAL POUCH SCREW

Martha Doesinger, New York, N. Y.

Application July 2, 1932. Serial No. 620,720

3 Claims. (Cl. 220—4)

One object of this invention is the provision of a sectional pouch screw, or more particularly, a plurality of curved cylindrically surfaced sections adapted to be joined together to form a complete cylindrical member adapted to be inserted into a cylindrical housing such as a tube.

Another object of the invention is to provide such a cylindrical member with screw threads on the outer surface so that the member may be screwed into a housing provided with similar screw threads on its interior surface.

Still another object of the invention is the provision of a cylindrical tube-like member formed of three or more complementary cylindrically-curved sections adapted to be joined end to end to form a cylindrical tube-like member.

The above and other objects will become apparent in the description below, in which characters of reference refer to like-named parts on the drawing.

Referring briefly to the drawing, Figure 1 is a longitudinal cross-sectional view through the completed cylindrical member inserted in a tube-like container.

Figure 2 is an end view of Figure 1 with the cap of the container removed.

Figure 3 is a cross-sectional view taken on the line 3—3 of Figure 1.

Figure 4 is a perspective view of one of the tube-forming sections.

Figure 5 is a perspective view of another of the tube-forming sections.

Figure 6 is a perspective view of a modified form of one of the tube-forming sections.

Figure 7 is a perspective view of another of the modified form of tube-forming sections.

Referring in detail to the drawing, the numeral 10 indicates the cylindrical body of a container having a removable cap 11 and a closed bottom 12. The cylindrical surface of this container is provided with alternate grooves and ridges 13 to form screw threads on the inner surface of the container 10. The cylindrical tube insertable in the container 10 comprises an inner cylindrically curved layer 14 substantially rectangular in form, having one end 15 of the same width as the layer 14, and having a tongue 16 formed on the other end. By means of rivets 17 or any other suitable means, an outer similarly-curved layer 18 is permanently attached to the layer 14. The layer 18 is provided with ridges and grooves 19 so formed that when the various sections are joined together as will presently be descibed, the entire tube section thereby formed will be provided with screw threads adapted to engage the threads 13 of the container. By arranging the securing means or rivets 17 in the manner shown in Figures 4 and 5, each of the tube sections has its upper and lower edges, 18a, lying flush against the surface of the layer 14. That portion of the layer 18 between the portions 18a lies at a slight distance from the layer 14 so that a pocket 20 is provided between the edges 18a. The tongue 16 of one section is adapted to be inserted into the pocket 20 of the adjacent section, in order to join the sections together.

The form of sections shown in Figures 6 and 7, is substantially the same as that shown in Figures 4 and 5, and such parts which are identical have been similarly numbered. However, instead of being provided with a single tongue 16, on one end, the layer 14 is provided with a pair of spaced-apart tongues 21 separated by a recess 22, and the rivets 17 of the complementary end of the adjacent section are provided as shown in Figure 7, in order that in addition to the upper and lower edges 18b, the center portion 18c also lies flush with the surface of the layer 14. Hence, instead of a single pocket formed in this end of the adjacent section, two spaced-apart pockets 24 are thus formed, and in inserting the tongues 21 into these pockets, the center portion 18c registers in the recess 22, while the upper and lower edges 18b register in the shoulders 23, formed on one side of each of the tongues 21.

From the above description it is obvious that in order to form a complete cylindrical tube from three or more of the complementary sections described, it is necessary to simply insert the tongue or tongues on the end of one section into the pocket or pockets of the complementary end of the adjacent section. When a tube of greater diameter is desired, it is obvious that a greater number of sections such as those described are required to be joined together. The material used for these sections is preferably one possessing resiliency, so that the various sections will be normally urged to retain their interlocked relationship in the completed tube. When a tube has been completed, it is obvious that it may be inserted into the container 10 as a unitary tube and it may likewise be removed as a unit.

Obviously, modifications in form and structure may be made without departing from the spirit and scope of the invention.

I claim:

1. In a tube of the class described, a plurality of sections adapted to be joined end to end to form the tube, each of said sections comprising a layer having a tongue projecting from one end thereof, a second layer forming part of said section and secured to said first layer, said section having a pocket formed between said layers on the end opposite to said tongue, the tongue of one of said sections being adapted to register in the pocket of the adjacent section to mutually interlock said sections.

2. In a tube of the class described, a plurality of sections adapted to be joined end to end to form the tube, each of said sections comprising an inner layer having a tongue projecting from one end thereof and an outer layer secured to said inner layer, said section having a pocket formed between said layers on the end opposite to said tongue, the tongue of one of said sections being adapted to register in the pocket of the adjacent section to mutually interlock said sections.

3. In a tube of the class described, a plurality of sections adapted to be joined end to end to form the tube, each of said sections comprising an inner layer having a tongue projecting from one end thereof and an outer layer secured to said inner layer, said section having a pocket formed between said layers on the end opposite to said tongue, the tongue of one of said sections being adapted to register in the pocket of the adjacent section to mutually interlock said sections, said outer layer being provided with screw threads, said threads of said outer layers aligning when said sections are assembled into a tube to form a continuous screw thread on said tube, said assembled tube being adapted to be screwed into a threaded cylindrical container.

MARTHA DOESINGER.